(12) United States Patent
Cho et al.

(10) Patent No.: US 11,339,752 B2
(45) Date of Patent: May 24, 2022

(54) AIR CLEANER FOR VEHICLE

(71) Applicant: Leehan Corporation, Suwon-si (KR)

(72) Inventors: Cheong Yong Cho, Siheung-si (KR);
Hyun Kee Jang, Suwon-si (KR)

(73) Assignee: Leehan Corporation, Suwon-si (KR)

( * ) Notice: Subject to any disclaimer, the term of this patent is extended or adjusted under 35 U.S.C. 154(b) by 113 days.

(21) Appl. No.: 16/839,358

(22) Filed: Apr. 3, 2020

(65) Prior Publication Data

US 2020/0232425 A1 Jul. 23, 2020

Related U.S. Application Data

(62) Division of application No. 15/321,869, filed as application No. PCT/KR2015/006517 on Jun. 25, 2015, now Pat. No. 10,641,215.

(30) Foreign Application Priority Data

Jun. 25, 2014 (KR) .................. 10-2014-0078341
Jun. 25, 2014 (KR) .................. 10-2014-0078344
(Continued)

(51) Int. Cl.
*B01D 53/02* (2006.01)
*F02M 35/02* (2006.01)
(Continued)

(52) U.S. Cl.
CPC ..... *F02M 35/0218* (2013.01); *B01D 46/0036* (2013.01); *B01D 46/10* (2013.01);
(Continued)

(58) Field of Classification Search
CPC ........ B01D 2253/102; B01D 2257/702; B01D 46/0036; B01D 46/10; B01D 53/02;
(Continued)

(56) References Cited

U.S. PATENT DOCUMENTS 3,998,614 A 12/1976 Schonberger et al.
5,120,334 A 6/1992 Cooper
(Continued)

FOREIGN PATENT DOCUMENTS

CN 101052455 A 10/2007
DE 10 2005 016 393 A1 5/2006
(Continued)

OTHER PUBLICATIONS

International Search Report for PCT/KR2015/006517 dated Oct. 1, 2015 [PCT/ISA/210].

*Primary Examiner* — Christopher P Jones
(74) *Attorney, Agent, or Firm* — Sughrue Mion, PLLC

(57) ABSTRACT

The present invention discloses an air cleaner for a vehicle. An air cleaner for a vehicle according to an embodiment of the present invention includes: a housing having an intake port for suctioning air and an outtake port for supplying the air suctioned through the intake port to an engine system of the vehicle; and an element installed in the housing to filter the air suctioned through the intake port, and the air cleaner further includes an evaporation gas collecting unit installed at an upper part of the inside of the housing to collect evaporation gas.

2 Claims, 13 Drawing Sheets

(30) Foreign Application Priority Data

| | | | |
|---|---|---|---|
| Jun. 25, 2014 | (KR) | ........................ | 10-2014-0078348 |
| Jun. 25, 2014 | (KR) | ........................ | 10-2014-0078352 |
| Jun. 25, 2014 | (KR) | ........................ | 10-2014-0078355 |
| May 4, 2015 | (KR) | ........................ | 10-2015-0062503 |

(51) Int. Cl.

| | |
|---|---|
| *F02M 35/024* | (2006.01) |
| *B60K 15/00* | (2006.01) |
| *F02M 37/00* | (2006.01) |
| *B60K 13/02* | (2006.01) |
| *F02M 35/14* | (2006.01) |
| *F02M 35/04* | (2006.01) |
| *B01D 46/00* | (2022.01) |
| *B01D 46/10* | (2006.01) |

(52) U.S. Cl.
CPC .............. *B01D 53/02* (2013.01); *B60K 13/02* (2013.01); *B60K 15/00* (2013.01); *F02M 35/0201* (2013.01); *F02M 35/024* (2013.01); *F02M 35/02416* (2013.01); *F02M 35/02491* (2013.01); *F02M 35/042* (2013.01); *F02M 35/14* (2013.01); *F02M 37/00* (2013.01); *B01D 2253/102* (2013.01); *B01D 2257/702* (2013.01)

(58) Field of Classification Search
CPC ........... F02M 35/0201; F02M 35/0218; F02M 35/024; F02M 35/02416; F02M 35/02491; F02M 35/042; F02M 35/14
See application file for complete search history.

(56) References Cited

U.S. PATENT DOCUMENTS

| | | |
|---|---|---|
| 5,906,189 A | 5/1999 | Mukai |
| 6,390,073 B1 | 5/2002 | Meiller |
| 6,758,885 B2 | 7/2004 | Leffel et al. |
| 7,344,586 B2 | 3/2008 | Zulauf |
| 10,046,266 B2 | 8/2018 | Meirav |
| 2004/0011197 A1 | 1/2004 | Wernholm et al. |
| 2004/0182240 A1 | 9/2004 | Bause et al. |
| 2004/0227513 A1 | 11/2004 | Weissenberger |
| 2007/0022880 A1 | 2/2007 | Mizutani |
| 2009/0120046 A1 | 5/2009 | Huff |
| 2011/0039489 A1 | 2/2011 | Pedigo |
| 2012/0222641 A1 | 9/2012 | Mackenzie |
| 2013/0228145 A1 | 9/2013 | Moyer |
| 2018/0119653 A1 | 5/2018 | Ishizuka |

FOREIGN PATENT DOCUMENTS

| | | |
|---|---|---|
| DE | 10 2013 203 013 A1 | 9/2013 |
| JP | 6-004363 U | 1/1994 |
| JP | 2003-120445 A | 4/2003 |
| JP | 2003-214264 A | 7/2003 |
| JP | 2007-056878 A | 3/2007 |
| KR | 10-2007-0083883 A | 8/2007 |
| KR | 10-2014-0036768 A | 3/2014 |

AIR CLEANER FOR VEHICLE

CROSS-REFERENCE TO RELATED APPLICATIONS

This application is a Divisional Application of U.S. application Ser. No. 15/321,869, filed on Dec. 23, 2016, which is a National Stage Entry of PCT/KR2015/006517, filed on Jun. 25, 2015, which claims priority under 35 U.S.C. § 119(a) to Korean Patent Application No. 10-2014-0078341, 10-2014-0078344, 10-2014-0078348, 10-2014-0078352, 10-2014-0078355, all filed on Jun. 25, 2014 and Korean Patent Application No. 10-2015-0062503, filed on May 4, 2015, in the Korean Intellectual Property Office, the disclosures of which are incorporated herein by reference in their entirety.

DESCRIPTION

Technical Field

The present invention relates to an air cleaner for a vehicle, and more particularly, to an air cleaner for a vehicle which is installed in an intake system of a vehicle to filter air supplied to an engine system and effectively collect evaporation gas.

Background Art

In general, an engine of a vehicle generates power while mixing and combusting fuel and air.

That is, the fuel stored in a fuel tank passes through various fuel supply devices and is mixed with the air which flows from outdoor air to be injected to a cylinder of the engine and the engine repeats suction, compression, explosion, and exhaust strokes to generate the power.

A predetermined amount of air is required to generate the power by driving the engine and air required for normal combustion is suctioned into the vehicle from outdoor air to be supplied to an engine system.

An intake system for supplying the air to the engine system may be normally constituted by a duct structure providing a flow path of the air, a resonator for reducing noise, an air cleaner filtering the suctioned air, and the like.

In this case, the air cleaner suctions the required air according to engine negative pressure of the engine, and the like in communication with the outdoor air and supplies the suctioned air to the engine system through an element, and the like.

However, since the air cleaner for the vehicle is originally used for supplying the air to the engine system, but is in communication with the outdoor air, the air cleaner for the vehicle may serve as a passage to discharge evaporation gas such as carbon hydrogen generated from the engine system to the outdoor air.

That is, when the evaporation gas generated from the engine system flows backward through the duct structure, and the like, a problem in that the evaporation gas is emitted to the outdoor air through an intake port.

Accordingly, the air cleaner in the related art is configured to include a body 1 having an accommodation space formed therein, an intake port 2 formed at one side of the bottom of the body 1, and an outtake port 3 formed at one side of the top of the body 1, as illustrated in FIG. 1 and an element 4 for filtering the air and evaporation gas adsorption filters 5 disposed on the top of the element 4 in parallel are configured to be disposed in the body 1.

As a result, the air flows in the body 1 through the intake port 2 and the air which flows in is discharged to the outtake port 3 by passing through the body 1 and in this case, the air sequentially passes through the element 4 and the evaporation gas adsorption filter 5 to filter dust therein, and as a result, clean air flows in a combustion chamber.

Further, the evaporation gas generated from the combustion chamber flows in the body 1 through the outtake port 3 and the evaporation gas is adsorbed by the evaporation gas adsorption filter 5 not to be discharged to the outside.

However, the element 4 and the evaporation gas adsorption filter 5 are vertically positioned, and as a result, a structure of the air cleaner in the related art becomes larger.

Further, when the evaporation gas adsorption filter 5 is configured in a filter type and the air cleaner in the related art is continuously used, foreign materials are adsorbed in the adsorption filter 5, and as a result, intake negative pressure decreases and performance deteriorates and activated charcoal powder for adsorbing the evaporation gas is suctioned to the engine by intake pressure.

Accordingly, the air cleaner for the vehicle is devised so as to solve the problem in the related art.

DETAILED DESCRIPTION OF INVENTION

Technical Problem

Embodiments of the present invention are to provide an air cleaner for a vehicle which can filter air and effectively collect evaporation gas in spite of manufacturing the air cleaner compactly to minimize discharge of outdoor air of the evaporation gas and decrease intake negative pressure in spite of continuously using the air cleaner to prevent a problem in engine performance of the vehicle.

Embodiments of the present invention are to provide an air cleaner for a vehicle which can reduce noise generated in suctioning air.

Embodiments of the present invention are to provide an air cleaner for a vehicle which includes an evaporation gas colleting unit attached to and detached from an outtake port of the air cleaner to collect evaporation gas which flows backward from an engine, thereby minimizing discharge of outdoor air of the evaporation gas.

Embodiments of the present invention are to provide an air cleaner for a vehicle which includes a carbon hydrogen collecting device having an enhanced structure, which is installed at a location maximally close to an engine to enhance adsorption efficiency of carbon hydrogen and a noise reduction effect and arbitrarily control a capacity of active carbon for adsorbing the carbon hydrogen.

Technical Solution

According to a first embodiment of the present invention, provided is an air cleaner for a vehicle including: a housing having an intake port for suctioning air and an outtake port for supplying the air suctioned through the intake port to an engine system of the vehicle; and an element installed in the housing to filter the air suctioned through the intake port, and the air cleaner further includes an evaporation gas collecting unit installed at an upper part of the inside of the housing to collect evaporation gas.

According to a second embodiment of the present invention, provided is an air cleaner for a vehicle including: a housing having an intake port for suctioning air and an outtake port for supplying the air suctioned through the intake port to an engine system of the vehicle; and an element installed in the housing to filter the air suctioned through the intake port, and the air cleaner includes an evaporation gas collecting unit which is in communication with the inside of the housing at an upper part of the outside of the housing and active carbon is provided in the evaporation gas collecting unit.

According to a third embodiment of the present invention, provided is an air cleaner for a vehicle including: a housing having an intake port for suctioning air and an outtake port for supplying the air suctioned through the intake port to an engine system of the vehicle; and an element installed in the housing to filter the air suctioned through the intake port, and the air cleaner includes an evaporation gas collecting unit installed at an upper part of the outside of the housing to collect evaporation gas which flows backward an engine and a noise attenuation member capable of reducing noise generated when air is suctioned is further included in the evaporation gas collecting unit.

According to a fourth embodiment of the present invention, provided is an air cleaner for a vehicle including: a housing having an intake port for suctioning air and an outtake port for supplying the air suctioned through the intake port to an engine system of the vehicle; and an element installed in the housing to filter the air suctioned through the intake port, and the air cleaner further includes an evaporation gas collecting unit capable of collecting evaporation gas which flows backward in the engine system in an air hose connecting the outtake port and an engine.

According to a fifth embodiment of the present invention, provided is an air cleaner for a vehicle including: a housing having an intake port for suctioning air and an outtake port for supplying the air suctioned through the intake port to an engine system of the vehicle; and an element installed in the housing to filter the air suctioned through the intake port, and the air cleaner further includes an evaporation gas collecting unit attached to/detached from the outtake port to collect evaporation gas which flows backward in the engine system of the vehicle.

Meanwhile, according to another embodiment of the present invention, a carbon hydrogen collecting device includes: a first body; a second body coupled to the end of the first body; and a carbon hydrogen adsorption unit disposed in an inside space of a connection portion of the first body coupled with the second body to reduce intake noise and prevent carbon hydrogen from flow in the air cleaner, the carbon adsorption unit includes, a first adsorption portion inserted into the first body, a second adsorption portion inserted into the second body, and multiple active carbon particles disposed in the first and second adsorption portions, and the first and second adsorption portions may be coupled to each other and thereafter, modularized and inserted into the first and second bodies.

Advantageous Effects

In an air cleaner for a vehicle according to an embodiment of the present invention, an evaporation gas collecting unit capable of collecting evaporation gas which flows backward in an engine system of the air cleaner is formed to prevent the evaporation gas from flowing out to the outside and a separate evaporation gas collecting unit is not provided in an engine room of the vehicle to secure an available space.

Further, in an air cleaner for a vehicle according to another embodiment, a noise attenuation member is provided in the air cleaner so as to serve as a resonator to offset noise generated during suctioning.

In addition, in an air cleaner for a vehicle according to yet another embodiment of the present invention, an evaporation gas collecting unit can be attached to and detached from an outtake port of a housing to effectively collect evaporation gas which flows backward in an engine system of a vehicle.

Moreover, according to still yet another embodiment of the present invention, since a carbon hydrogen adsorption unit made of a compressed and molded non-woven fabric, which accommodates active carbon is modularized and inserted in first and second bodies, the carbon hydrogen adsorption unit is modularized and configured in various shapes to correspond to shapes of the first and second bodies and mounting locations of the first and second bodies of the carbon hydrogen adsorption unit are disposed to a closer location such as an engine or a turbocharger than the air cleaner to enhance carbon hydrogen collection efficiency and a noise reduction effect and the carbon hydrogen is effectively collected from oil mist generated while the engine drops to effectively prevent the carbon hydrogen from being leaked to the outside through an air intake port of the air cleaner.

BEST MODE

Hereinafter, embodiments of the present invention will be described with reference to the accompanying drawings. However, the following embodiments are provided to help appreciating the present invention and the scope of the present invention is not limited to the following embodiments. Further, the following embodiments are provided so as to more completely describe the present invention for those skilled in the art and detailed description of known configurations which are determined to unnecessarily obscure the spirit of the present invention will be omitted.

Figure 1:
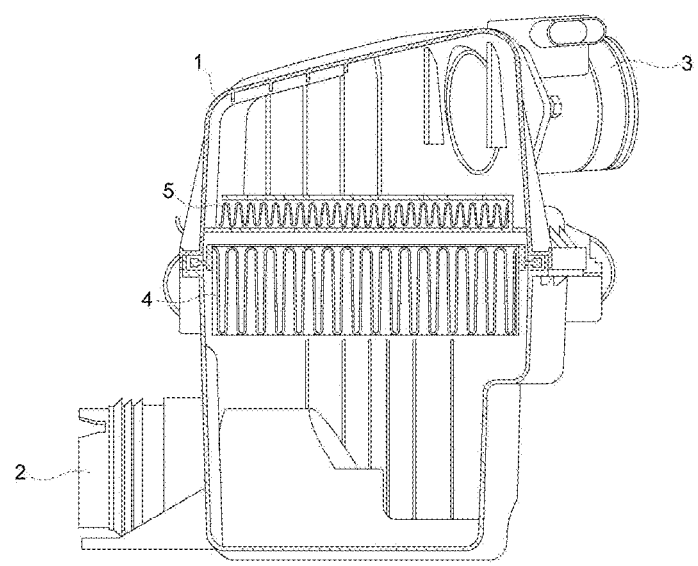
FIG. 1 is a diagram schematically illustrating an air cleaner for a vehicle in the related art.
Figure 2:
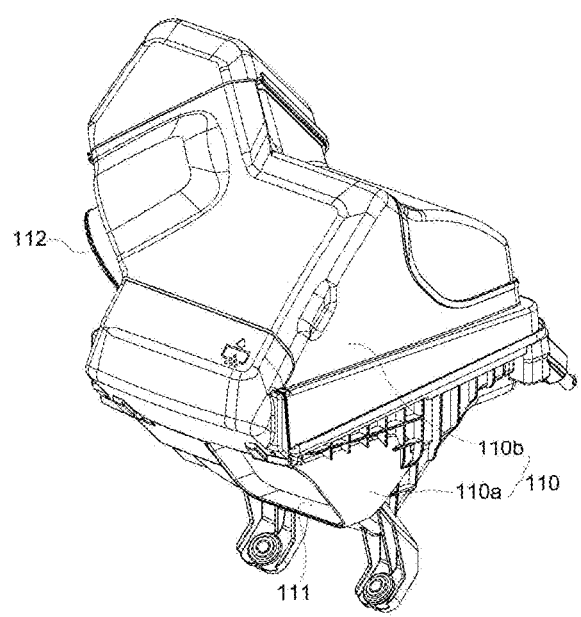
FIG. 2 is a diagram schematically illustrating an air cleaner for a vehicle according to a first embodiment of the present invention.

FIG. 2 is a diagram schematically illustrating an air cleaner for a vehicle according to an embodiment of the present invention.

Referring to FIG. 2, the air cleaner 100 for a vehicle according to the embodiment may include a housing 110 constituted by a body part 110a having an intake port 111 and a cover part 110b having an outtake port 112.

The housing 110 may form an overall exterior of the air cleaner 100 for a vehicle and has a predetermined space part for mounting an element 120 (see FIG. 3) or flow of suctioned air therein. The element 120 mounted in the housing 110 which is used for filtering the suctioned air has been known in the related art and is distant from the technical spirit of the present invention, therefore, detailed description thereof will be omitted.

The housing 110 may include the intake port 111 for suctioning air from outdoor air and an outtake port 112 for discharging the suctioned air to the outside of the housing 110 and supplying the discharged air to an engine, and the like. In the embodiment, as illustrated in FIG. 2, a case is illustrated, in which the intake port 111 is disposed at a lower end of the housing 110, that is, the body part 110a and the outtake port 112 is disposed at an upper end, that is, a left side of the cover part 110b. However, layouts of the intake port 111 and the outtake port 112 may be variously designed and changed as necessary.

Further, although not illustrated, an air duct (not illustrated) which is in communication with the outdoor or an engine system may be connected to each of the intake port 111 and the outtake port 112 and the housing may be divided into a plurality of portions for assemblability or easy replacement of the element 120. However, a division structure of the air duct or the housing 110 may also be variously designed and changed as necessary, of course.

The air cleaner 100 for a vehicle suctions the outdoor air through the intake port 111 and the suctioned air may be filtered while passing through the element 120 disposed in the housing 110. Further, the filtered air is discharged from the air cleaner 100 for a vehicle through the outtake port 112 and supplied to the engine system of the vehicle through the air duct, and the like again. All operations may be performed similarly the air cleaner for a vehicle, which is known in the related art.

Figure 3:
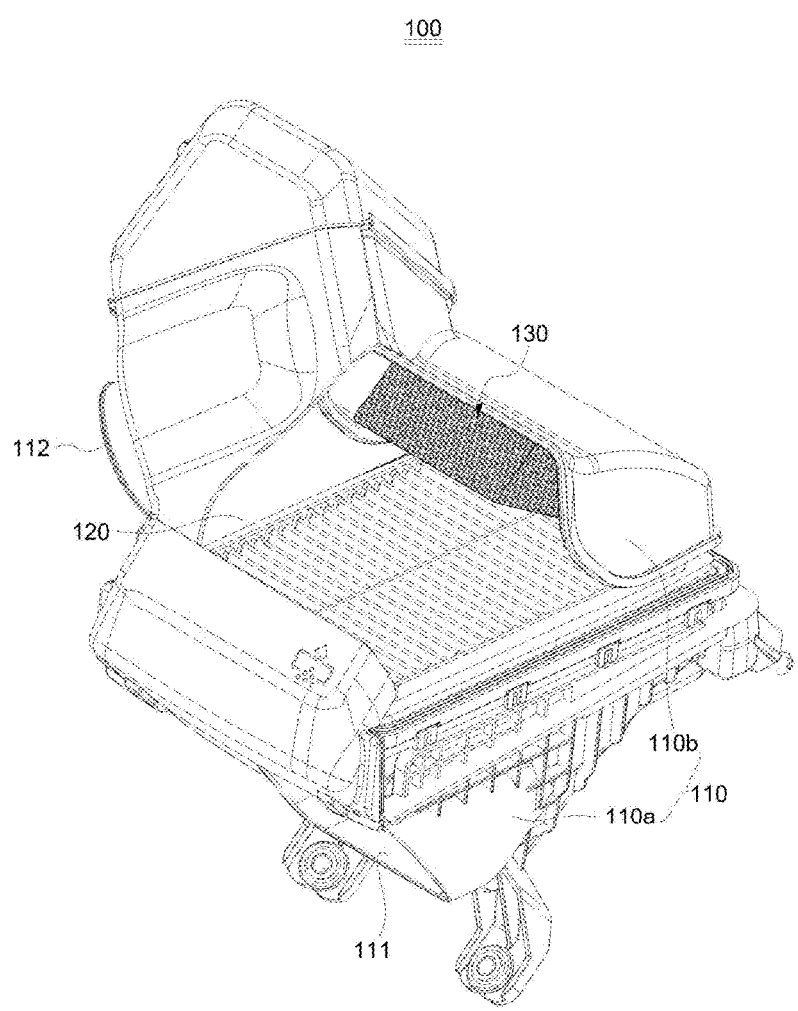
FIG. 3 is a perspective view illustrating an interior of a housing by removing one side of the top of the housing in the air cleaner for the vehicle illustrated in FIG. 2.

FIG. 3 is a perspective view illustrating an interior of a housing by removing one side of the top of the housing in the air cleaner for the vehicle illustrated in FIG. 2.

Referring to FIG. 3, the element 120 may be mounted and disposed in the housing 110 and the element 120 has a substantially quadrangular plate shape and is disposed in the housing 110 to be mounted and disposed to partition upper and lower parts of the housing 110.

Accordingly, the air suctioned through the intake port 11 passes through the element 120 while flowing upward in the housing 110 and during such a process, the suctioned air may be filtered. However, the shape and the structure of the element 120, a flow direction of the suctioned air, and the like may be designed and changed as necessary, of course.

Figure 4:
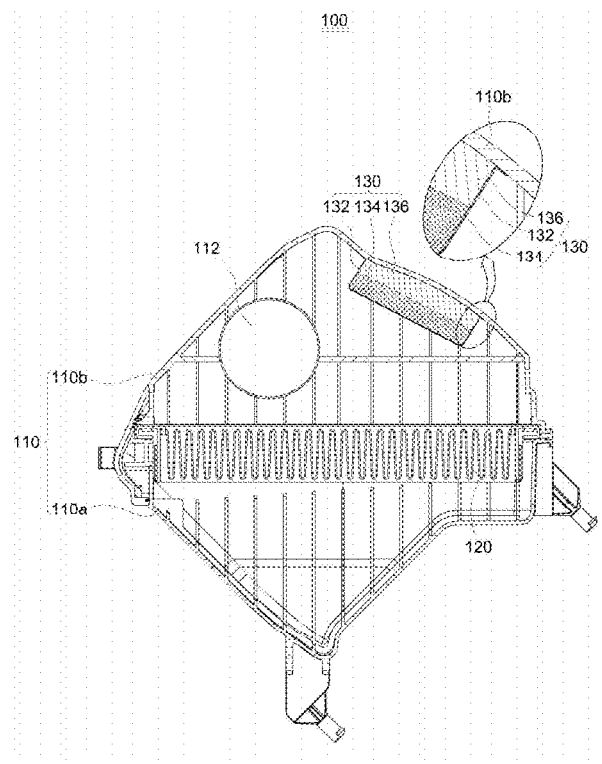
FIG. 4 is a side cross-sectional view of the air cleaner for a vehicle according to the first embodiment of the present invention.

Meanwhile, the air cleaner 100 for a vehicle according to the embodiment of the present invention may further include an evaporation gas collecting unit 130 inside the housing 110, preferably, an upper part of the inside of the cover part 110b, as illustrated in FIGS. 3 and 4.

The evaporation gas collecting unit 130 may collect evaporation gas which flows backward in the housing 110 and may be constituted by a casing 132 formed to have an available space formed therein, active carbon 134 accommodated in the casing 132, and a compression sponge 136 preventing the active carbon 134 accommodated in the casing 132 from being leaked to the outside.

In detail, the casing 132 is made of non-woven fabric and is fused to the upper part of the inside of the cover part 110b and the casing is configured to have minute vents to make air to pass and prevent the active carbon 134 accommodated therein from being leaked to the outside.

Herein, the casing 132 fused to the cover part 110b is fixed and installed through ultrasonic fusion, but such a method may be changed to various methods including thermal fusion, vibration fusion, and the like which may stably fix the active carbon 134 in the casing 130.

Further, the compression sponge 136 is installed on the top of the active carbon 134 accommodated in the casing 132 to prevent the active carbon 134 from being leaked to the outside of the casing 132 by impact and vibration and prevent the active carbon 134 from being condensed at one location to evenly distribute the active carbon 134.

Accordingly, the evaporation gas which flows backward in the housing 110, in particular, a carbon hydrogen component is adsorbed while passing through the active carbon to effectively remove the evaporation gas.

Further, since the evaporation gas collecting unit 130 that may collect the evaporation gas is installed inside the housing 110 of the air cleaner 100, a separate means for collecting separate evaporation gas is not provided in an engine room of the vehicle to secure the available space.

Figure 5:
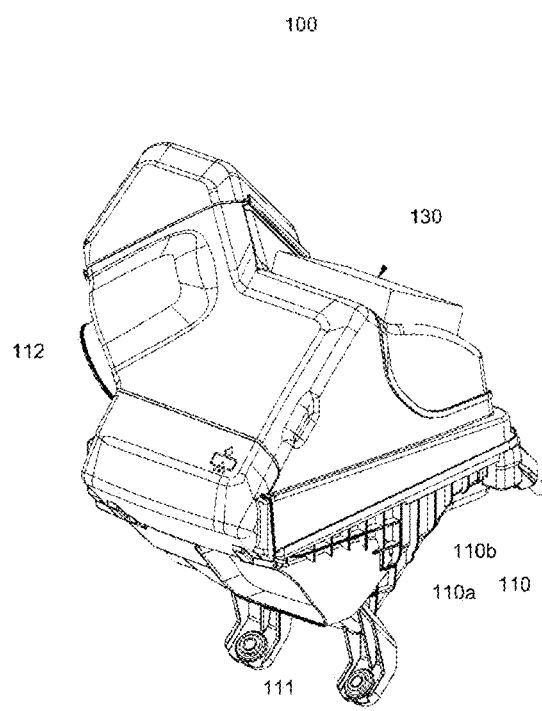
FIG. 5 is a diagram schematically illustrating an air cleaner for a vehicle according to a second embodiment of the present invention.
Figure 6:
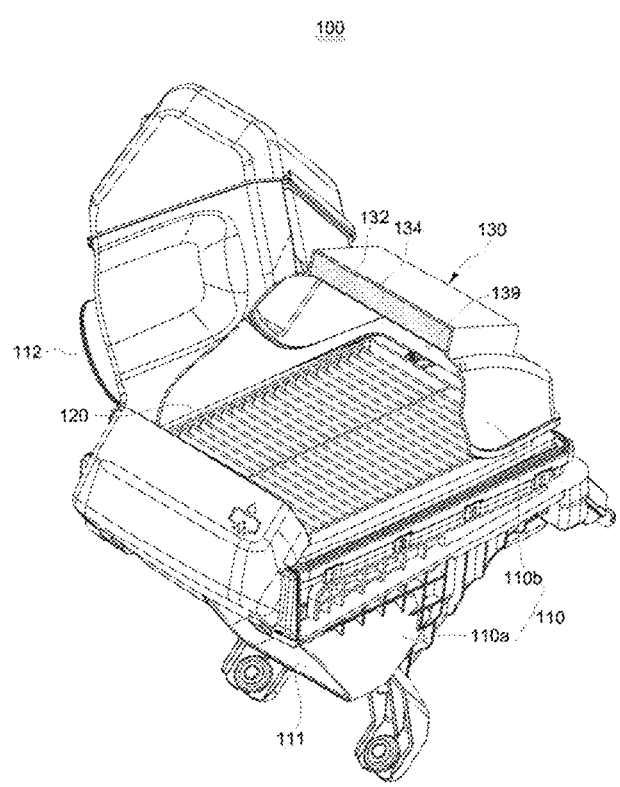
FIG. 6 is a perspective view illustrating an interior of a housing by removing one side of the top of the housing in the air cleaner for the vehicle illustrated in FIG. 5.

FIG. 5 is a diagram schematically illustrating an air cleaner for a vehicle according to a second embodiment of the present invention and FIG. 6 is a perspective view illustrating an interior of a housing by removing one side of the top of the housing in the air cleaner for the vehicle illustrated in FIG. 5.

Referring to FIGS. 5 and 6, the element 120 may be mounted and disposed in the housing 110 and the element 120 has the substantially quadrangular plate shape and is disposed in the housing 110 to be mounted and disposed to partition the inside of the housing 110 into upper and lower parts.

Accordingly, the air suctioned through the intake port 11 passes through the element 120 while flowing upward in the housing 110 and during such a process, the suctioned air may be filtered. However, the shape and the structure of the element 120, a flow direction of the suctioned air, and the like may be designed and changed as necessary, of course.

Figure 7:
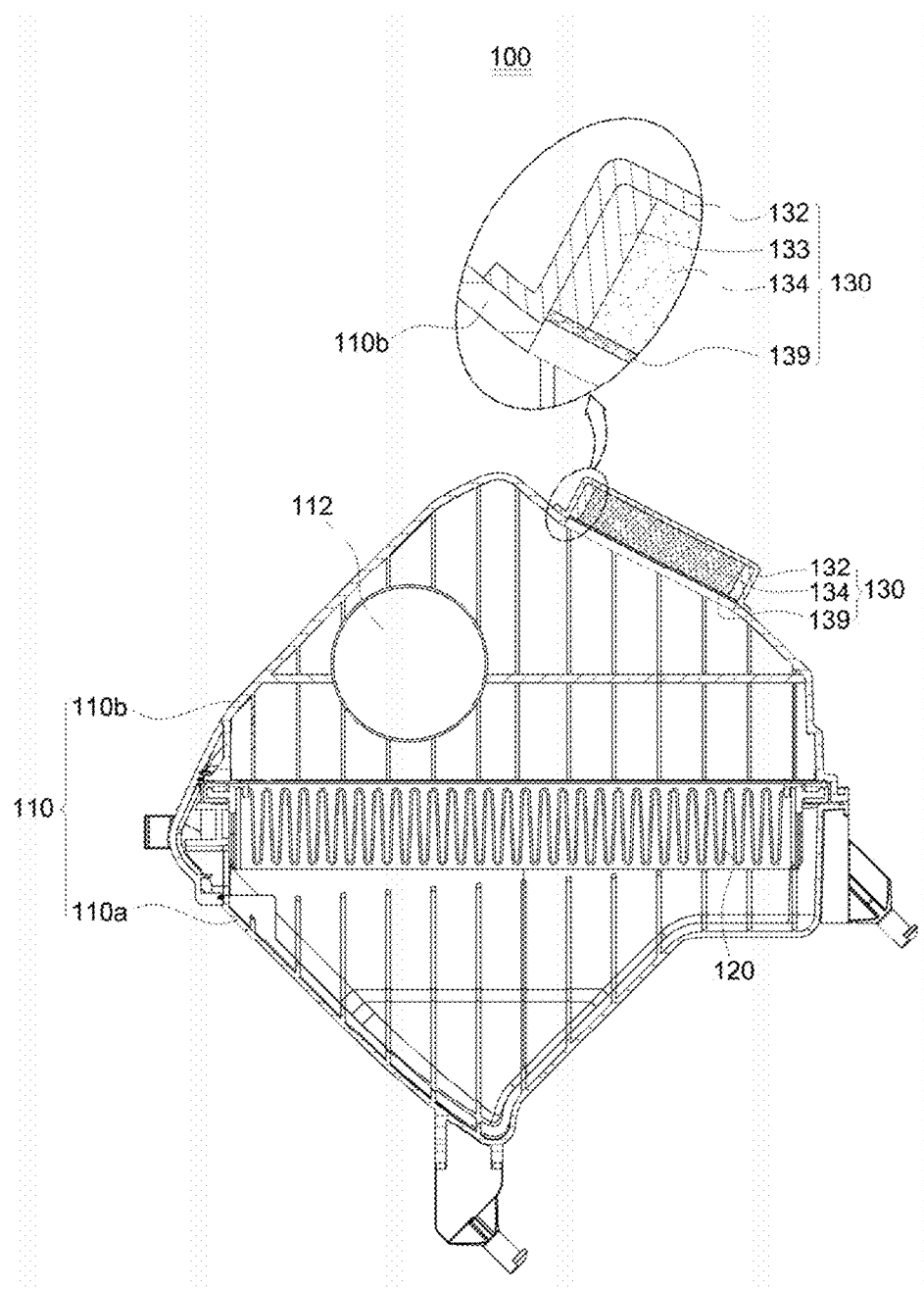
FIG. 7 is a side cross-sectional view of the air cleaner for a vehicle according to the second embodiment of the present invention.

Meanwhile, the air cleaner 100 for a vehicle according to the embodiment of the present invention may further include an evaporation gas collecting unit 130 inside the housing 110, preferably, the outside of the upper part of the cover part 110b as illustrated in FIGS. 5 to 7.

The evaporation gas collecting unit 130 may collect evaporation gas which flows backward in the housing 110 and may be constituted by a casing 132 formed to have an available space formed therein, active carbon 134 accommodated in the casing 132, and a cover member 139 preventing the active carbon 134 accommodated in the casing 132 from being leaked to the outside.

In detail, the casing 132 is formed in a box shape having an accommodation space therein and positioned to protrude at the outer upper part of the cover part 110b. In this case, the accommodation space in the casing 132 formed to protrude to the outside of the cover part 110b is installed to be in communication with the inside of the housing 110.

Further, the casing 132 which is formed to have predetermined rigidity may be formed integrally with the housing 110 and in some cases, the casing 132 may be fixed and installed through fusion.

In this case, the casing 132 may be fused by any one method of the ultrasonic fusion, the thermal fusion, and the vibration fusion and in the embodiment of the present invention, the casing 132 is fixed through the ultrasonic fusion for easy operation.

The active carbon 134 which is accommodated in the casing 132 allows the evaporation gas which flows in the housing 110 to be adsorbed while passing through the active carbon 134 to remove the evaporation gas, in particular, the carbon hydrogen component.

The cover member 139 which partitions the accommodation space of the casing 132 and an internal space of the housing 110 is formed to have a plurality of minute vents so as to prevent the active carbon 134 in the casing 132 from being leaked to the outside and enable the air to pass.

In this case, the cover member 139 is fixed to and installed in the casing 132 through fusion and a step portion 133 is formed along a side wall on the inner periphery of the casing 132 and a circumference portion of the cover member 139 may be thus fused with the step portion 133, and as a result, the cover member 139 is strongly fixed to prevent the active carbon 134 in the casing 132 from being removed.

Accordingly, in the air cleaner 100 for a vehicle according to the embodiment of the present invention, when the evaporation gas flows backward in the housing 110, the evaporation gas flows in the casing 132 by passing through the minute vents of the cover member 139 and thereafter, the evaporation gas is adsorbed while detouring the active carbon 134 to be prevented from being leaked to the outside.

Figure 8:
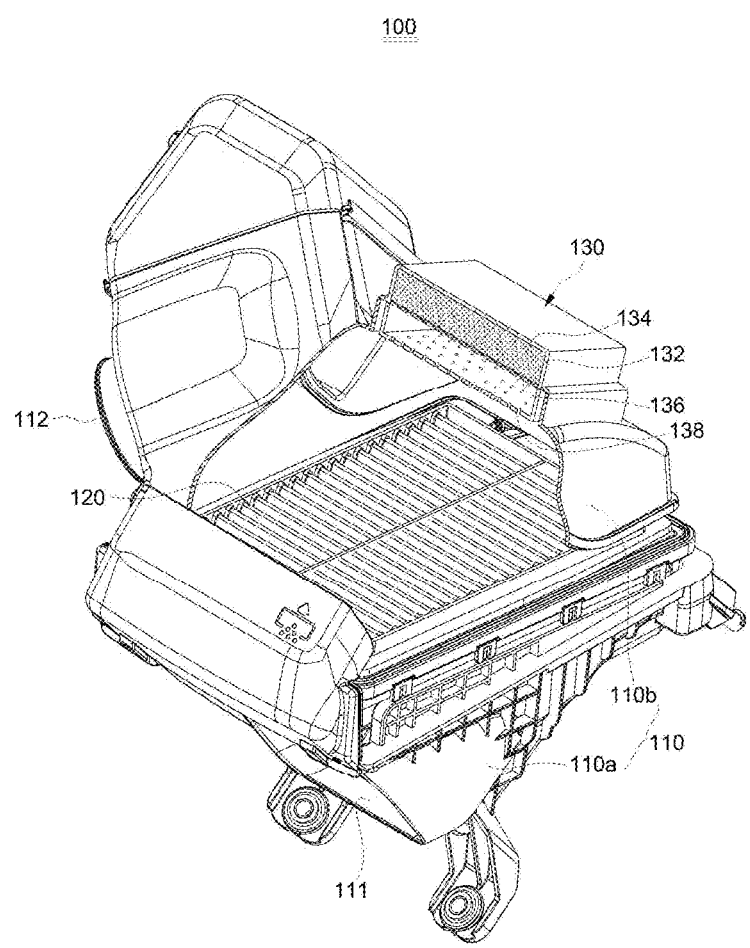
FIG. 8 is a perspective view illustrating an interior of a housing by removing one side of the top of a housing in an air cleaner for a vehicle according to a third embodiment of the present invention.
Figure 9:
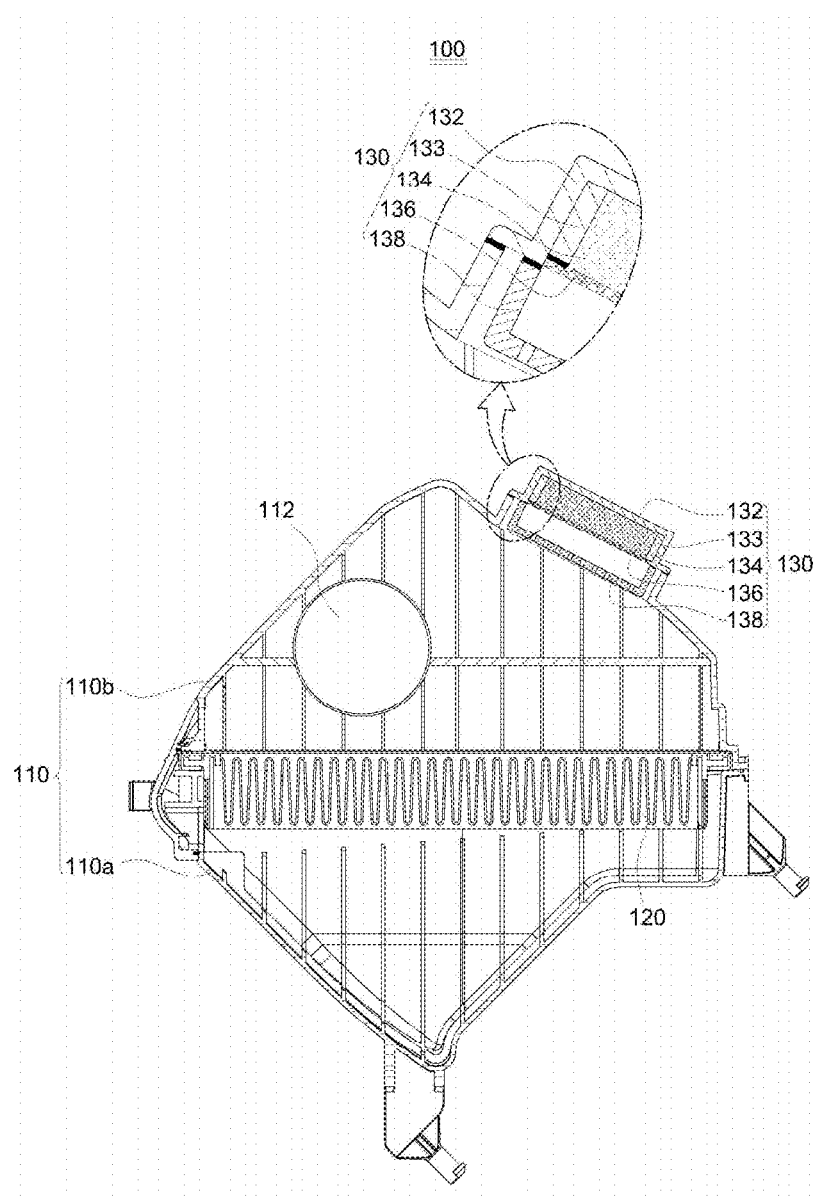
FIG. 9 is a side cross-sectional view of the air cleaner for a vehicle according to the third embodiment of the present invention.

FIG. 8 is a perspective view illustrating an interior of a housing by removing one side of the top of a housing in an air cleaner for a vehicle according to a third embodiment of the present invention and FIG. 9 is a side cross-sectional view of the air cleaner for a vehicle according to the third embodiment of the present invention.

The air cleaner 100 for a vehicle according to the third embodiment of the present invention may further include an evaporation gas collecting unit 130 at the outside of the upper part of the cover part 110a of the housing as illustrated in FIGS. 8 to 9.

The evaporation gas collecting unit 130 may collect evaporation gas which flows backward in the housing 110 and may be constituted by a casing 132 formed to have an available space formed therein, active carbon 134 accommodated in the casing 132, a cover member 139 preventing the active carbon 134 accommodated in the casing 132 from being leaked to the outside, and a noise attenuation member 138 installed at the lower part of the cover member 139, having the accommodation space therein, and a plurality of throughout-holes formed therein.

In detail, the casing 132 is formed in a box shape having an accommodation space therein and positioned to protrude at the outer upper part of the cover part 110b. In this case, the accommodation space in the casing 132 formed to protrude to the outside of the cover part 110b is installed to be in communication with the inside of the housing 110.

Further, the casing 132 which is formed to have predetermined rigidity may be formed integrally with the housing 110 and in some cases, the casing 132 may be fixed and installed through fusion.

In this case, the casing 132 may be fused by any one method of the ultrasonic fusion, the thermal fusion, and the vibration fusion and in the embodiment of the present invention, the casing 132 is fixed through the ultrasonic fusion for easy operation.

The active carbon 134 which is accommodated in the casing 132 allows the evaporation gas which flows in the housing 110 to be adsorbed while passing through the active carbon 134 to remove the evaporation gas, in particular, the carbon hydrogen component.

The cover member 139 which may prevent the active carbon 134 accommodated in the accommodation space of the casing 132 from being leaked to the outside of the casing 132 has a plurality of vents which is minutely formed.

In this case, the cover member 139 is fixed to and installed in the casing 132 through fusion and a step portion 133 is formed along a side wall on the inner periphery of the casing 132 and a circumference portion of the cover member 139 may be thus fused with the step portion 133, and as a result, the cover member 139 is strongly fixed to prevent the active carbon 134 in the casing 132 from being removed.

Accordingly, in the air cleaner 100 for a vehicle according to the embodiment of the present invention, when the evaporation gas flows backward in the housing 110, the evaporation gas flows in the casing 132 by passing through the minute vents of the cover member 139 and thereafter, the evaporation gas is adsorbed while detouring the active carbon 134 to be prevented from being leaked to the outside.

The noise attenuation member 138 has the box shape so as to have the accommodation space therein similarly to the casing 132, and has an upper part which is opened and is coupled with the casing 132 through the fusion.

In this case, the noise attenuation member 138 has the plurality of through-holes so as to be in communication with the internal space of the housing 110 to allow the air in the housing 110 to be taken in or out.

That is, the noise attenuation member allows some of the air which flows in the housing 110 of the air cleaner 100 to flow in, and as a result, some of the air in the housing 110 is suctioned in the accommodation space of the noise attenuation member 138 and pressure is thus reduced during an intake negative pressure state of the engine to offset noise.

Therefore, in the air cleaner 100 for a vehicle according to the embodiment of the present invention, the evaporation gas collecting unit 130 which is in communication with the housing 110 of the air cleaner is configured to further include the noise attenuation member 138 which may collect the evaporation gas which flows backward in the engine through the active carbon 134 and attenuate the noise generated during the intake negative pressure state to reduce the noise of the vehicle.

Further, the existing vehicle is configured to further include a resonator in order to reduce the noise, but since the air cleaner 100 for a vehicle according to the embodiment of the present invention includes the noise attenuation member 138 corresponding to the resonator, a separate resonator need not be provided, and as a result, a utilization space of the engine room may be secured.

Figure 10:
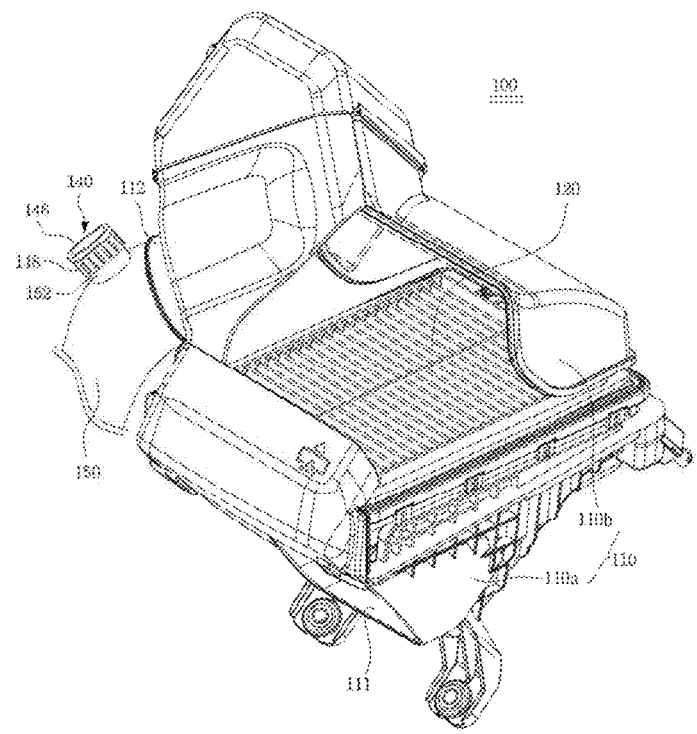
FIG. 10 is a perspective view illustrating an interior of a housing by removing one side of the top of a housing in an air cleaner for a vehicle according to a fourth embodiment of the present invention.
Figure 11:
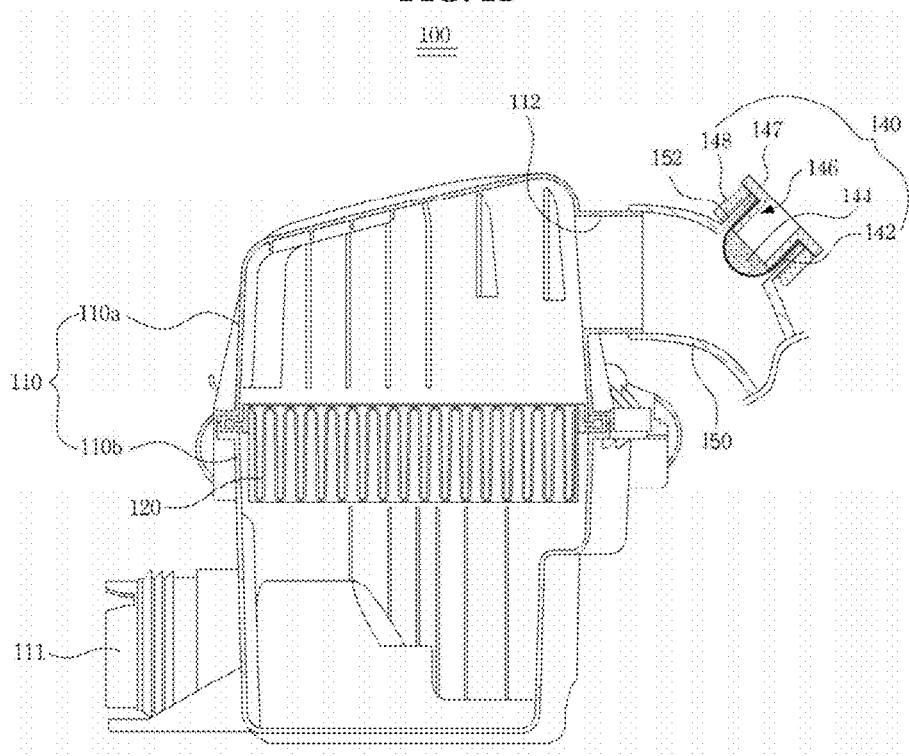
FIG. 11 is a side cross-sectional view of the air cleaner for a vehicle according to the fourth embodiment of the present invention.
Figure 12:
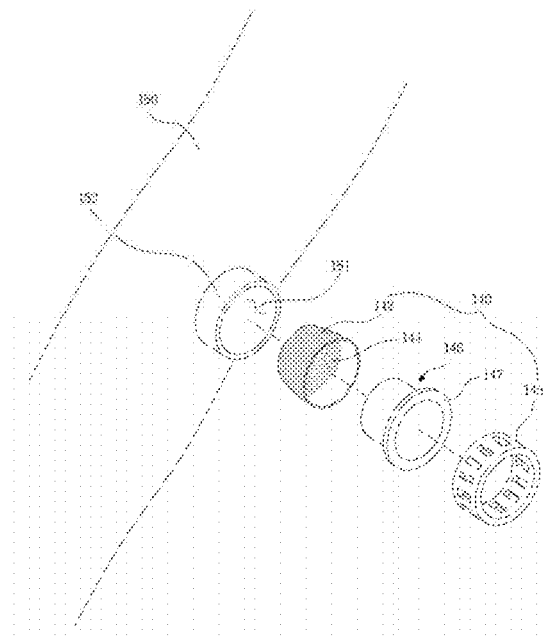
FIG. 12 is an exploded perspective view of an evaporation gas collecting unit provided in the air cleaner for a vehicle according to the fourth embodiment of the present invention.

FIG. 10 is a perspective view illustrating an interior of a housing by removing one side of the top of a housing in an air cleaner for a vehicle according to a fourth embodiment of the present invention, FIG. 11 is a side cross-sectional view of the air cleaner for a vehicle according to the fourth embodiment of the present invention, and FIG. 12 is an exploded perspective view of an evaporation gas collecting unit provided in the air cleaner for a vehicle according to the fourth embodiment of the present invention.

In the air cleaner 100 for a vehicle according to the fourth embodiment of the present invention, an evaporation gas collecting unit 140 capable of collecting the evaporation gas which flows backward in the engine system is installed in an air hose 150 connecting the outtake port 112 of the housing 110 and the engine as illustrated in FIG. 11.

To this end, in the air cleaner 100 for a vehicle according to the fourth embodiment of the present invention, perforation portions 151 may be formed at a part of the air hose 150 and thereafter, the evaporation gas collecting unit 140 may be inserted into the air hose 150 through the perforation portions 151.

In this case, the perforation portions 151 penetrates the exterior and the interior of the air house 150 and has coupling jaws 152 formed to protrude on the exterior thereof.

Further, the evaporation gas collecting unit 140 may include a non-woven fabric positioned in the air hose 150 through the perforation portions 151 and accommodating active carbon 144 therein, a plug 146 positioned in the coupling jaws 152 and preventing the active carbon 144 in the non-woven fabric 142 from being leaked to the outside, and a clamp 148 preventing the non-woven fabric 142 positioned in the perforation portions 151 and the plug 146 positioned in the coupling jaws 152 from being spaced apart from each other in the air hose 150.

The non-woven fabric 142 has the plurality of minute vents so as to prevent the active carbon 144 positioned therein from being leaked to the outside and allow external air to flow.

Further, the active carbon 144 positioned in the non-woven fabric 142 serves to adsorb the evaporation gas which flows backward in the engine system.

That is, while the active carbon 144 is inserted into the air hose 150 while being surrounded through the non-woven fabric 142, the evaporation gas which flows in the air hose 150 is collected while passing through the active carbon 144 via the non-woven fabric 142.

The plug 146 has a "⊏" shape and includes flanges 147 bent in a lateral direction at both ends and a part of the plug 146 is positioned to be inserted into the coupling jaws 152 formed in the air hose 150 and the bent flanges 147 are positioned to contact the coupling jaws 152.

In this case, the plug 146 serves to prevent the active carbon 144 positioned in the non-woven fabric 142 from being leaked to the outside.

The clamp 148 which is capable of preventing the plug 146 positioned in the coupling jaws 152 from being spaced apart from the air hose 150 is formed to have elastic force.

That is, while a part of the non-woven fabric 142 is positioned between the coupling jaws 152 and the plug 146, the coupling jaws 152 and the plug 146 are fixed by using the clamp 148 to prevent the non-woven fabric 142 and the plug 146 from being spaced apart from each other in the air hose 150.

Accordingly, in the air cleaner 100 for a vehicle according to the embodiment of the present invention, when the evaporation gas flows backward in the engine system, the evaporation gas is adsorbed on the active carbon 144 while passing through the active carbon 144 of the evaporation gas collecting unit 140 provided in the air hose 150 to effectively remove the evaporation gas.

Figure 13:
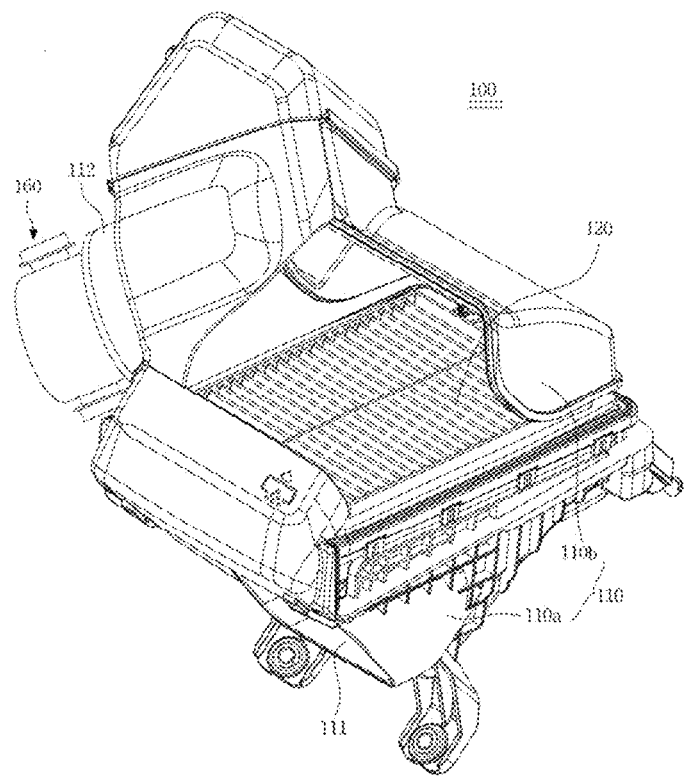
FIG. 13 is a perspective view illustrating an interior of a housing by removing one side of the top of a housing in an air cleaner for a vehicle according to a fifth embodiment of the present invention.
Figure 14:
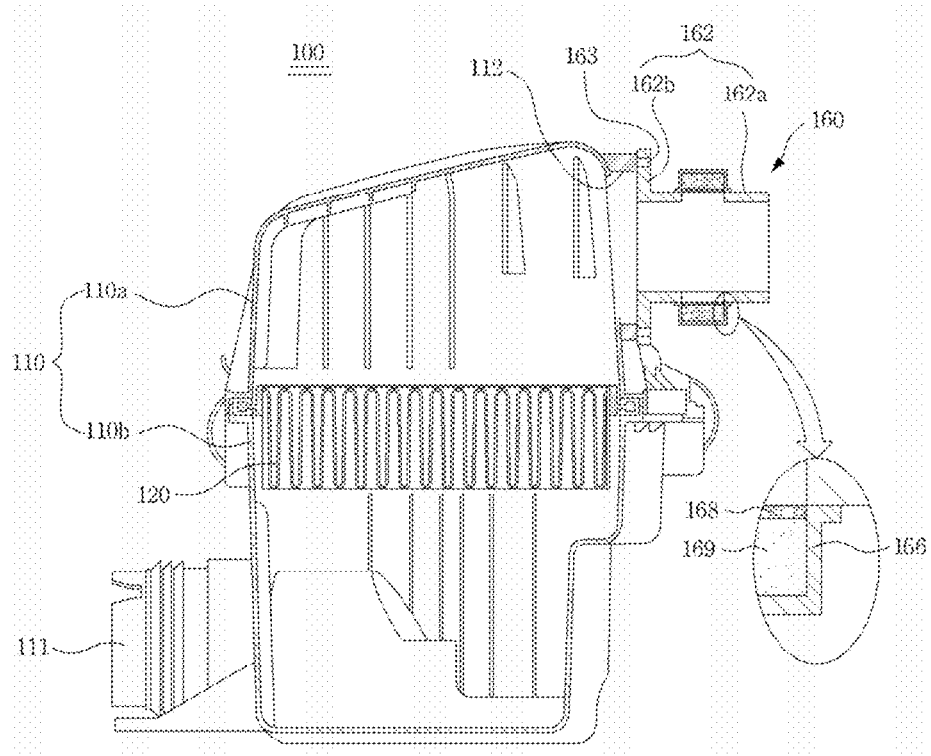
FIG. 14 is a side cross-sectional view of the air cleaner for a vehicle according to the fifth embodiment of the present invention.
Figure 15:
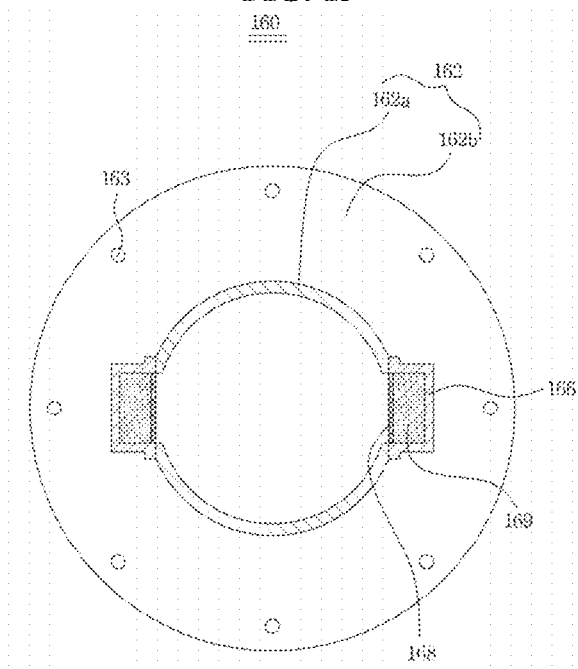
FIG. 15 is a block diagram schematically illustrating an evaporation gas collecting unit illustrated in FIG. 14.

FIG. 13 is a perspective view illustrating an interior of a housing by removing one side of the top of a housing in an air cleaner for a vehicle according to a fifth embodiment of the present invention, FIG. 14 is a side cross-sectional view of the air cleaner for a vehicle according to the fifth embodiment of the present invention, and FIG. 15 is a block diagram schematically illustrating an evaporation gas collecting unit illustrated in FIG. 14.

The air cleaner 100 for a vehicle according to the embodiment of the present invention may further include an evaporation gas collecting unit 160 which may collect the evaporation gas which flows backward in the engine system in the outtake port that discharges air purified by the element in the housing 110 to the engine as illustrated in FIG. 14.

The evaporation gas collecting unit 160 which is attached to/detached from the outtake port 112 to collect the evaporation gas, that is, carbon monoxide discharged from the engine system of the vehicle to prevent the carbon monoxide from being discharged to the outside of the vehicle may include a coupling member 162 to be attached to/detached from the outtake port 112 of the housing 110, a collection member 166 fused with the coupling member 162 and accommodating the active carbon 164 capable of collecting the evaporation gas which flows in the coupling member therein, and a non-woven fabric 168 preventing the active carbon 164 accommodated in the collecting member 164 from being leaked and allowing the air in the coupling member 162 to flow.

The coupling member 162 may be constituted by a pipe body 162a having a pipe shape with a hollow therein and a flange 162b formed at one end of the pipe body 162a to extend in a circumferential direction.

In this case, a plurality of screw holes 163 is formed at the flange 162b in the circumferential direction, and as a result, the flange 162b may be bolt-coupled with the outtake port 112 of the housing 110 through the screw holes 163.

The collection member 166 is fused to the pipe body 162a of the coupling member 162 and active carbon 164 is installed at both sides of the pipe body 162a to be in communication with the hollow and the active carbon 164 capable of collecting the evaporation gas is provided therein as illustrated in FIGS. 14 and 15.

The non-woven fabric 168 which prevents the active carbon 164 provided in the collection member 166 from being leaked and allows the evaporation gas which flows in the coupling member 162 to flow to the active carbon 164 in the collection member 166 has minute vents.

Accordingly, in the air cleaner 100 for a vehicle according to the embodiment of the present invention, when the evaporation gas flows backward in the engine system, the evaporation gas flows in the coupling member 162 installed in the outtake port 112 and the evaporation gas which flows is adsorbed while passing through the active carbon 164 in the collection member 166 via the non-woven fabric 168 to effectively remove the evaporation gas such as preventing the evaporation gas from being leaked to the outside, and the like.

Figure 16:
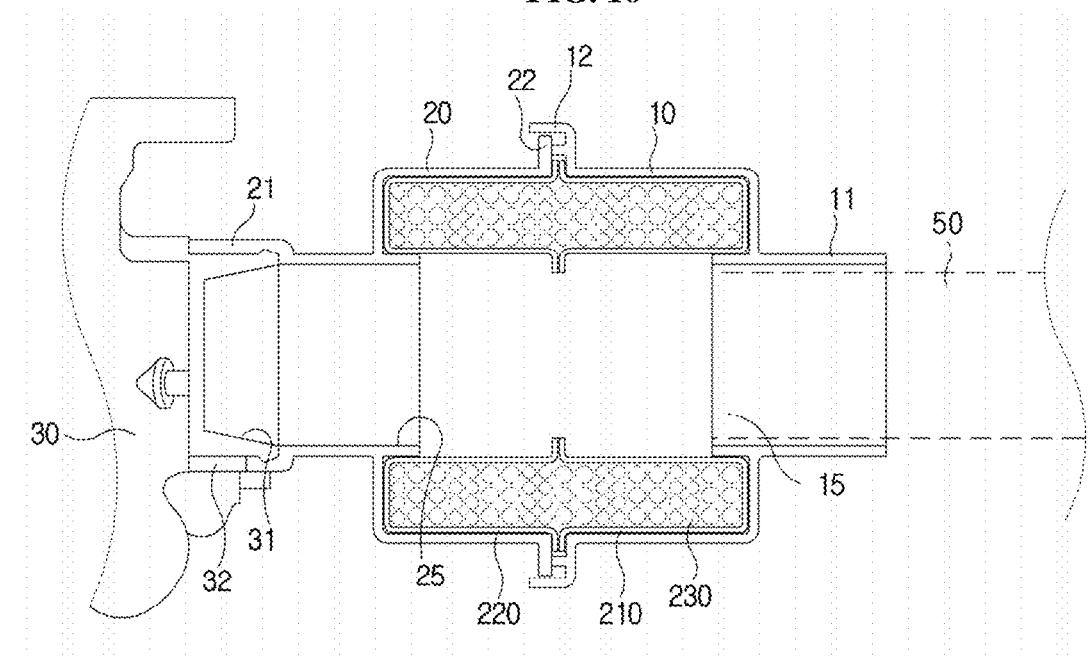
FIG. 16 is a cross-sectional view of a carbon hydrogen collecting device connected to an air cleaner for a vehicle according to another embodiment of the present invention.
Figure 17:
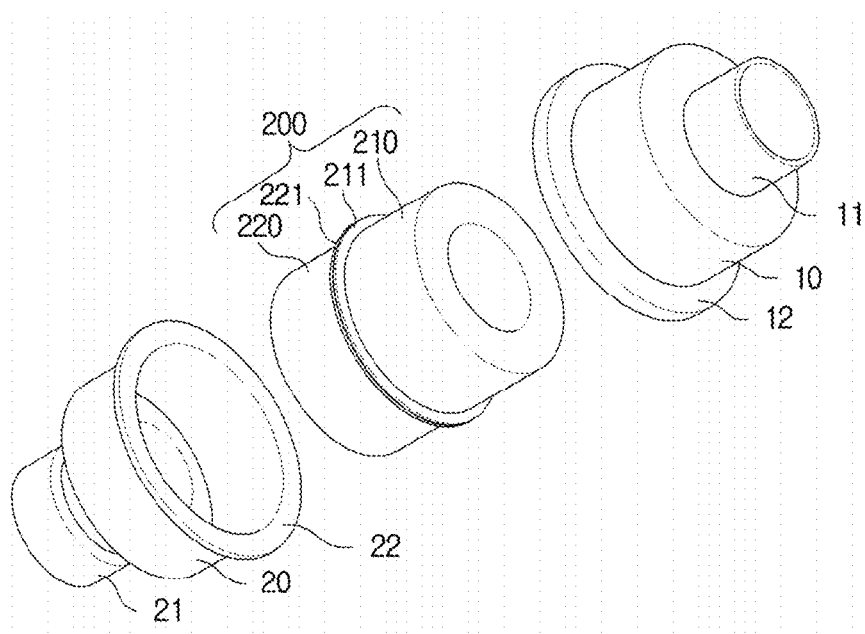
FIG. 17 is an exploded perspective view of FIG. 16.
Figure 18:
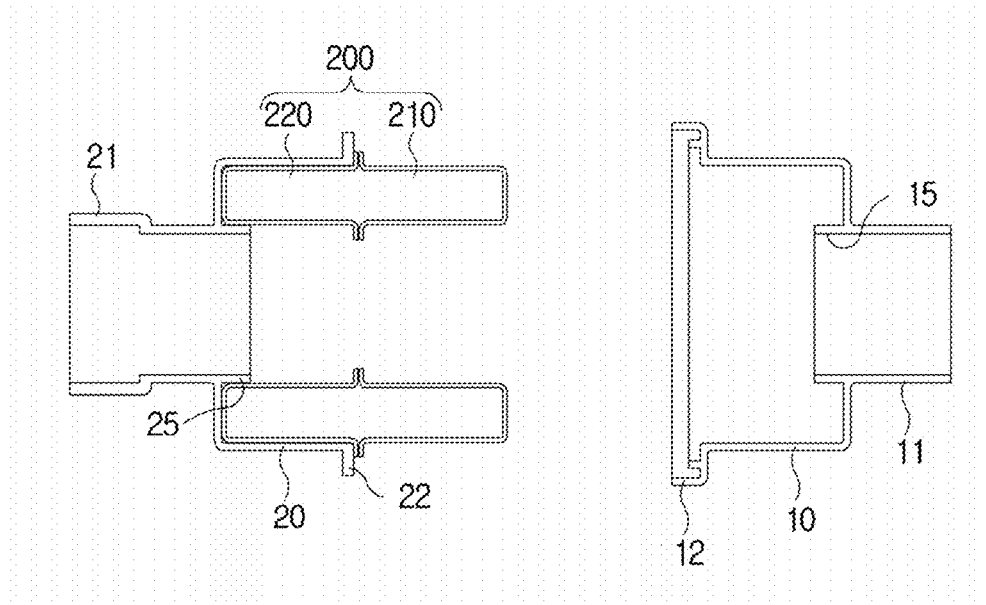
FIG. 18 is a cross-sectional view illustrating an exploded state of FIG. 16.
Figure 19:
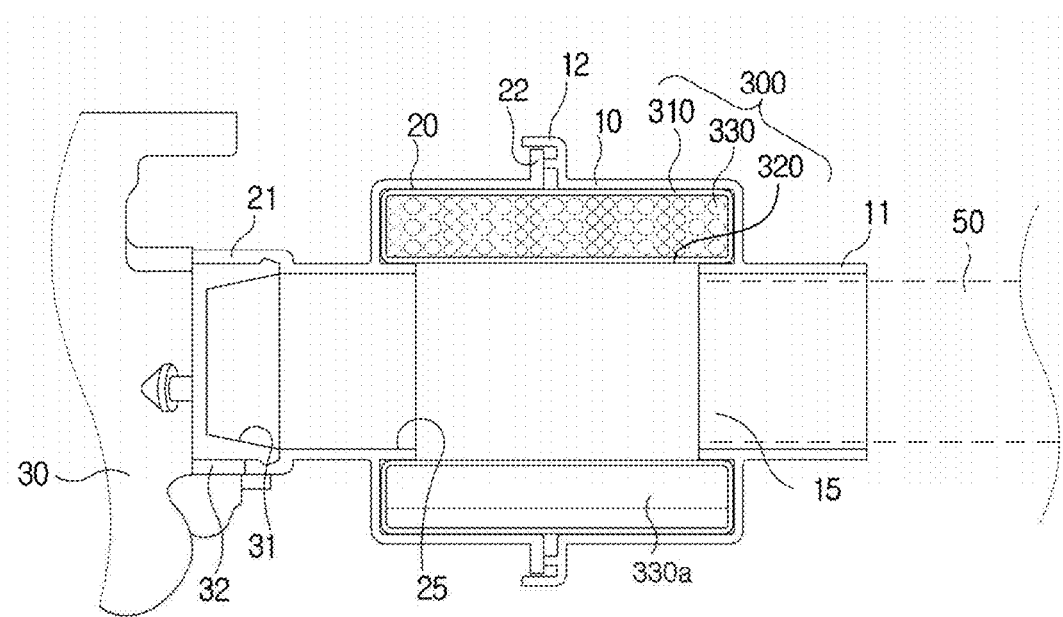
FIG. 19 is a cross-sectional view of a carbon hydrogen collecting device connected to an air cleaner for a vehicle according to yet another embodiment of the present invention.
Figure 20:
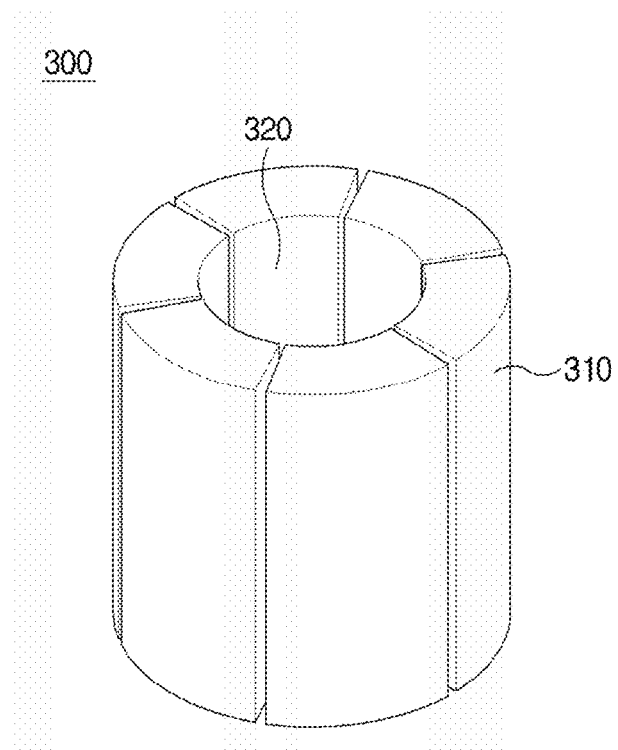
FIG. 20 is a perspective view of a carbon hydrogen adsorption unit connected to the air cleaner for a vehicle according to yet another embodiment of the present invention.
Figure 21:
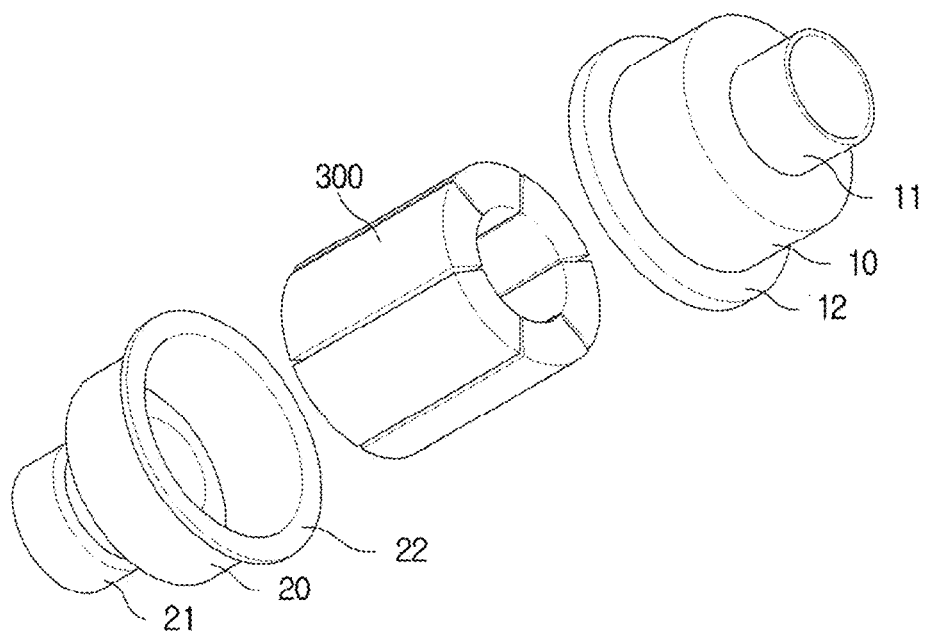
FIG. 21 is an exploded perspective view of FIG. 19.

FIG. 16 is a cross-sectional view of a carbon hydrogen collecting device connected to an air cleaner for a vehicle according to another embodiment of the present invention, FIG. 17 is an exploded perspective view of FIG. 16, FIG. 18 is a cross-sectional view illustrating an exploded state of FIG. 16, FIG. 19 is a cross-sectional view of a carbon hydrogen collecting device connected to an air cleaner for a vehicle according to yet another embodiment of the present invention, FIG. 20 is a perspective view of a carbon hydrogen adsorption unit connected to the air cleaner for a vehicle according to yet another embodiment of the present invention, and FIG. 21 is an exploded perspective view of FIG. 19.

As illustrated in FIGS. 16 to 18, a carbon hydrogen collecting device according to a first embodiment may include a first body 10, a second body 20, and a carbon hydrogen adsorbing unit 200.

One end of the first body 10 may be connected with the air hose 50 connected with an air cleaner (not illustrated) of the vehicle. To this end, a first connection portion 11 and a second connection portion 12 may be provided in the first body 10. The first connection portion 11 is connected with the air hose 50, and as a result, the air purified through the air cleaner may flow in the first connection portion 11. The first connection portion 11 may be provided in a cylindrical shape to protrude outward as illustrated in FIGS. 16 to 18 and the inner periphery of the first connection portion 11 may be provided in a shape corresponding to an inner diameter of the air hose 50. According to the embodiment, the air hose 50 may be inserted into the first connection portion 11 and although not illustrated, the air hose 50 may be inserted into the outer periphery and thereafter, fixed and coupled by a clamp, and the like. The second connection portion 12 which is provided for coupling with the second body 20 to be described below may be provided in a complimentary shape with a fourth connection portion 22 to be described below. That is, the second and fourth connection portions 12 and 22 may be fixed through mutual coupling and fixed and coupled by various methods. This will be described below again.

Meanwhile, a first suspension portion 15 may be formed in the first body 10 to protrude to an inside space. The first suspension portion 15 is provided in the cylindrical shape and one end of the carbon hydrogen adsorption unit 200 to be described below may be thus configured to be inserted into the outer periphery. A donut-shaped ring-type groove is formed between the inner periphery of the first body 10 and the outer periphery of the first suspension portion 15 and one end of the carbon hydrogen adsorption unit 200 may be inserted into the groove.

One end of the second body 20 may be connected with an engine 30 of the vehicle. In this case, one end of the body 20 may be connected with a turbocharger instead of the engine 30. To this end, a third connection portion 21 and a fourth connection portion 22 may be provided in the second body 20. The second connection portion 21 is connected with the engine 30, and as a result, the air purified through the air cleaner may be supplied to the engine 30. The third connection portion 21 may be provided in the cylindrical shape to protrude outward as illustrated in FIGS. 16 to 18 and the diameter of the inner periphery of the third connection portion 21 may correspond to the diameter of the inner diameter of the first connection portion 11. According to the embodiment, a coupling portion 31 of the engine 30 and the third connection portion 21 to be provided in the complimentary shape and primarily fixed by fitting coupling and thereafter, secondarily fixed to the outer periphery by a clamp 32, and the like. However, the present invention is not limited thereto and all structures which may be coupled and decoupled may be substituted and used.

The fourth connection portion 22 which is provided for coupling with the first body 10 may be provided in the complimentary shape with the second connection portion 12. That is, the second and fourth connection portions 12 and 22 may be fixed through mutual coupling and fixed and coupled by the fusion after surface contact or line contact according to the embodiment. However, the present invention is not limited thereto and the second and fourth connection portions 12 and 22 are provided in a flange shape to use a fastening member such as a screw, and the like.

Meanwhile, a second suspension portion 25 may be formed in the second body 20 to protrude to the inside space. The second suspension portion 25 is provided in the cylindrical shape and one end of the carbon hydrogen adsorption unit 200 to be described below may be thus configured to be inserted into the outer periphery. That is, the donut-shaped ring-type groove is formed between the inner periphery of the second body 20 and the outer periphery of the second suspension portion 25 and one end of the carbon hydrogen adsorption unit 200 may be inserted into the groove.

The carbon hydrogen adsorption unit 200 may include a first adsorption portion 210 and a second adsorption portion 22, and an active carbon particle 230.

The first adsorption portion 210 may be inserted into the inside space of the first body 10 and the second adsorption portion 22 may be inserted into the inside space of the second body 20. The first and second adsorption portions 210 and 220 may be provided in the cylindrical shape through the complimentary coupling and as illustrated in FIG. 17, first and second contact portions 211 and 221 having the flange shape are formed at the connection portions which engage with each other as illustrated in FIG. 17, and as a result, the first and second contact portions 211 and 221 are coupled with the connection portions by the method such as the fusion, or the like to be configured in the cylindrical shape.

Both the inner periphery and the outer periphery of the first and second adsorption portions 210 and 220 may be made of the same material and according to the embodiment, the first and second adsorption portions 210 and 220 may be made of a compression molding non-woven fabric having air permeability. That is, the non-woven fabric including multiple active carbon particles 230 is compressed and molded in the cylindrical shape illustrated in FIG. 17 and separately injection-molded into the first adsorption portion 210 inserted into the first body 10 and the second adsorption portion 220 inserted into the second body 20 and thereafter, they are individually coupled to form one module or individually separately insert and assemble the first and second bodies 10 and 20.

When the non-woven fabric is modularized into the first and second adsorption portions 210 and 220, a charge amount and a volume of the active carbon particle 230 may be easily variable according to a condition of an intake system which needs to be installed to enhance assemblability.

Meanwhile, an air path corresponding to flow path diameters of the first and second bodies 10 and 20 may be formed in the carbon hydrogen adsorption unit 200 having the cylindrical shape, which is formed by coupling the first and second adsorption portions 210 and 220. In this case, the air path is made of the permeable non-woven fabric and carbon hydrogen in the air is configured to be adsorbed on the active carbon, and the like.

Meanwhile, a carbon hydrogen collecting device according to a second embodiment is the same as the first embodiment in most configurations. However, as illustrated in FIGS. 19 and 20, both the first and second embodiments may be slightly different from each other in terms of a structure of a carbon hydrogen adsorption unit 300.

That is, according to the second embodiment, the carbon hydrogen adsorption unit 300 may be provided as a cylindrical member having a single shape, which includes an outer diameter portion 310 and an inner diameter portion 320. That is, the carbon hydrogen adsorption unit 300 is provided in a hollow-shaped cylindrical shape and the outer diameter portion 310 may be inserted and coupled into each of the first and second bodies 10 and 20 and the inner diameter portion 320 is formed to have diameters corresponding to the first and third connection portions 11 and 21 to form the air flow path. In addition, multiple active carbon particles 330 are inserted between the outer diameter portion 310 and the inner diameter portion 320 to adsorb the carbon hydrogen.

Meanwhile, in the carbon hydrogen adsorption unit 300, as illustrated in FIG. 21, a plurality of modules may be alternately disposed and in this case, in respective modules, a module made only by the non-woven fabric and a module made of the non-woven fabric including the active carbon particle may be radially alternately disposed.

Meanwhile, commonly to the first and second embodiments, the second and fourth connection portions 12 and 22 of the first and second bodies 10 and 20 may be provided in the complimentary shape so as to be coupled by the thermal or ultrasonic fusion as described above.

In addition, the second body 20 is coupled with any one of the engine 30 of the vehicle and a turbo charger (not illustrated) and a distance between the second body 20, and the engine 30 and the turbo charger may be shorter than the distance between the first body 10 and the air cleaner. Through such a configuration, the carbon hydrogen in oil mist which flows backward at the engine side may be more effectively collected and noise caused by the air flow, which is generated from the engine 30 may be adsorbed by the carbon hydrogen adsorption units 200 and 300 made of the non-woven fabric, and the like.

According to the embodiment, since the carbon hydrogen adsorption units 200 and 300 made of the compressed and molded non-woven fabric accommodating the active carbon particles 230 and 330 are modularized and inserted into the first and second bodies 10 and 20, the carbon hydrogen adsorption units 200 and 300 may be modularized and configured in various shapes corresponding to the shapes of the first and second bodies 10 and 20.

Further, since mounting locations of the carbon hydrogen adsorption units 200 and 300 are closer to the engine 30 or the turbo charger than the air cleaner, carbon hydrogen collection efficiency and a noise reduction effect may be enhanced and the carbon hydrogen is effectively collected from the oil mist generated when the engine 30 stops to effectively prevent the carbon hydrogen from being leaked to the outside through an air intake port of the air cleaner.

As described above, embodiments of the present invention have been described, but it will be appreciated by those skilled in the art that the present invention may be modified and changed in various ways without departing from the spirit of the present invention described in the claims by the addition, change, deletion or addition of constituent elements, and that the modifications and changes are included in the claims of the present invention.

The invention claimed is:

1. An air cleaner for a vehicle, comprising:
   a housing having an intake port for suctioning air and an outtake port for supplying the air suctioned through the intake port to an engine system of the vehicle; and
   an element installed in the housing to filter the air suctioned through the intake port,
   wherein the air cleaner further includes an evaporation gas collecting unit capable of collecting evaporation gas which flows backward in the engine system in an air hose connecting the outtake port and an engine, and
   wherein the evaporation gas collecting unit has perforation portions penetrating an interior and an exterior, which are formed in a part of the air hose and installed at coupling jaws formed to protrude to the outside of the perforation portions, and includes a non-woven fabric accommodating active carbon therein, a plug positioned in the coupling jaws and configured to prevent the active carbon in the non-woven fabric from being leaked to the outside, and a clamp configured to prevent the non-woven fabric positioned in the perforation portions and the plug positioned in the coupling jaws from being spaced apart from each other in the air hose.

2. The air cleaner for a vehicle of claim 1, wherein the clamp has elastic force.

* * * * *